United States Patent [19]
Williams

[11] Patent Number: 4,802,502
[45] Date of Patent: Feb. 7, 1989

[54] PURGE AIR CONTROL SYSTEM

[75] Inventor: Henry L. Williams, Oklahoma City, Okla.

[73] Assignee: Geolograph Pioneer, Inc., Oklahoma City, Okla.

[21] Appl. No.: 16,854

[22] Filed: Feb. 20, 1987

[51] Int. Cl.⁴ .............................................. B65D 25/00
[52] U.S. Cl. ..................................... 137/382; 137/377; 137/554; 220/88 B; 312/223
[58] Field of Search ...................... 137/377, 382, 554; 220/88 B; 312/223

[56] References Cited
U.S. PATENT DOCUMENTS

| | | | |
|---|---|---|---|
| 3,474,823 | 10/1969 | Finalyson et al. | 137/554 |
| 3,587,618 | 6/1971 | Kenyon | 220/88 B X |
| 3,703,192 | 11/1972 | Staudacher et al. | 137/554 |
| 3,777,928 | 12/1973 | Kober | 220/88 B |
| 4,169,225 | 9/1979 | Rickert et al. | 220/88 B X |
| 4,211,251 | 7/1980 | Rickert et al. | 220/88 B X |
| 4,616,694 | 10/1986 | Hsieh | 220/88 B X |

Primary Examiner—Alan Cohan
Assistant Examiner—John Rivell
Attorney, Agent, or Firm—William S. Dorman

[57] ABSTRACT

A purge control system providing a non-hazardous environment within an electronics enclosure comprises a purge air box housing non-electrical components having fluid communication lines between them. An outlet supplies inert gas under pressure from a supply to the enclosure and an inlet receives inert gas under pressure from the enclosure. A pressure regulator mounted in the box in fluid communication with the supply provides the air to a manifold distributing air to a flow meter providing flow of air to the enclosure through the outlet and determining rate of flow to the outlet; a signal valve having one inlet communicating with the manifold and another inlet communicating with the inlet; the signal valve having an outlet providing a pneumatic signal when pressure is received at the inlet; a first pneumatic light on the box connected to the outlet of the signal valve indicates the status of air coming from the enclosure; a time-delay pneuamtic relay connected to the outlet of the signal valve providing a delayed signal responsive to the signal received by the signal valve; an explosion-proof, pneumatically operated switch connected to the output of the time-delay relay providing electrical power to the enclosure responsive to the delayed signal; a second pneumatic light on the box responsive to the delayed signal indicating the status of electrical power. The system includes a two-way valve actuating an alarm when pressure from the enclosure falls below a predetermined value.

5 Claims, 4 Drawing Sheets

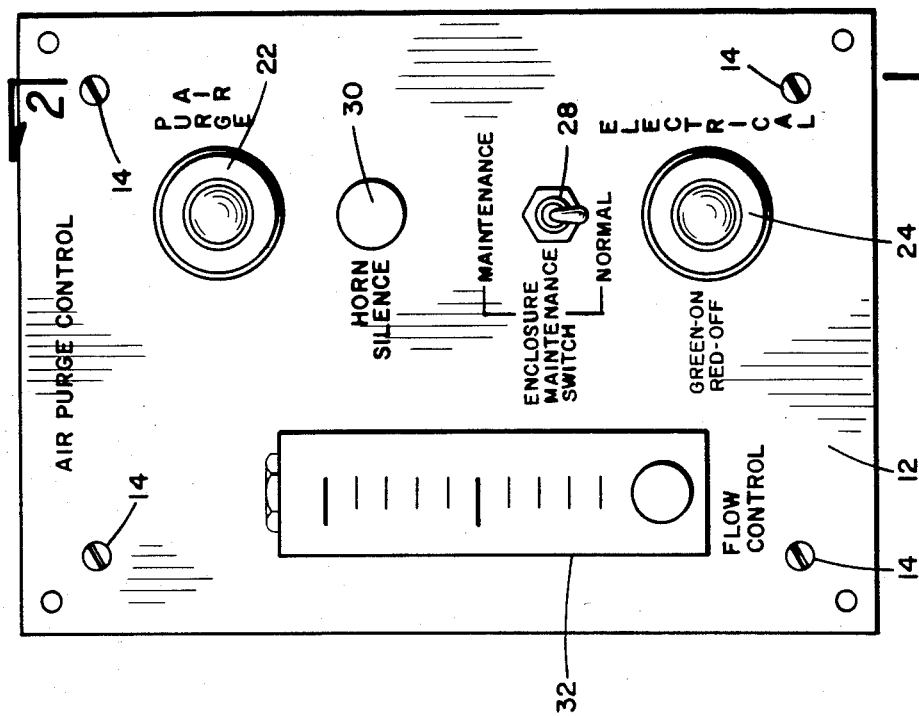
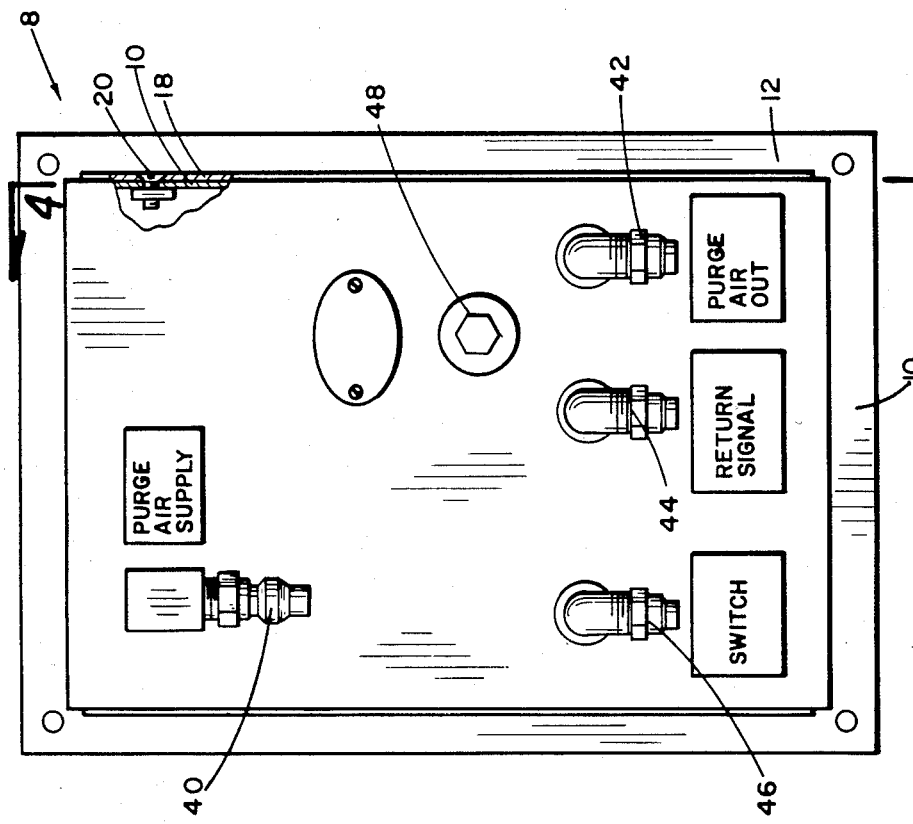

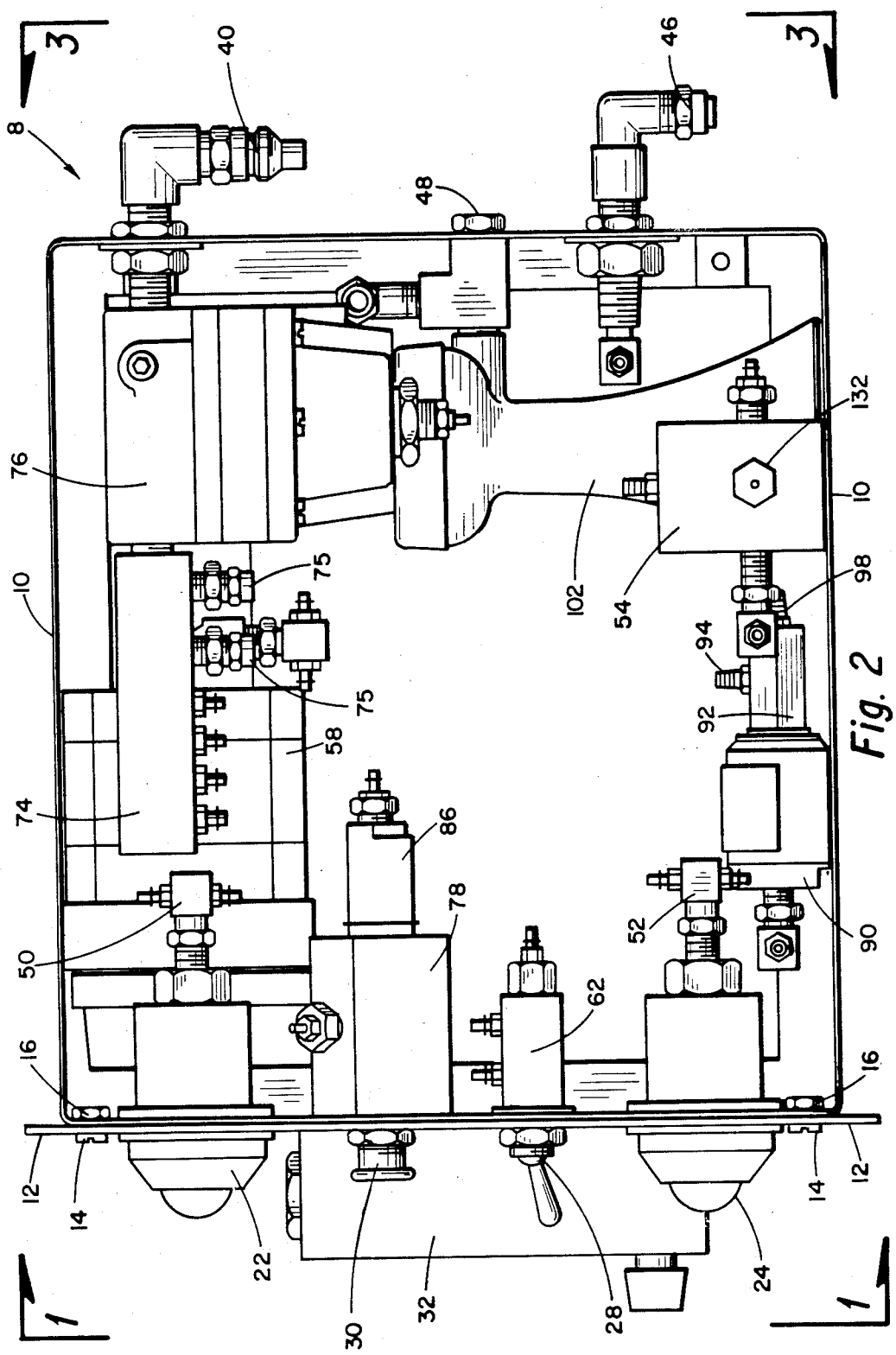

PURGE AIR CONTROL SYSTEM

BACKGROUND OF THE INVENTION

1. Field of the Invention

The present invention relates to a purge control system to be used in conjunction with an electronics enclosure. More particularly, the present invention relates to a purge control system for use in hazardous areas to create a non-hazardous or non-explosive atmosphere within an electrical instrument enclosure.

2. Prior Art

It is often necessary to use electrical measurement devices or the like in a hazardous environment such as a drilling rig area, refinery or coal mine. These hazardous environments usually contain a mixture of natural gas that can explode if electrical equipment is activated. Therefore methods or systems have have been developed to make electrical equipment "safe" to use. These safe environments include explosion-proof enclosures, equipment submerged in oil or other substances, or purged enclosures.

A preliminary search was conducted on the above, and the following prior art U.S. patents were uncovered:

| U.S. Pat. No. | Patentee | Issue Date |
| --- | --- | --- |
| 3,703,192 | Staudacher et al. | November 21, 1972 |
| 3,777,928 | Kober | December 11, 1973 |
| 4,301,113 | Alguire et al. | November 17, 1981 |
| 3,989,461 | Skocypec et al. | November 2, 1976 |
| 4,317,797 | Smith | March 2, 1982 |
| 4,228,197 | Means | October 14, 1980 |

An alarm and safeguard system for a controlled environment box is disclosed in U.S. Pat. No. 3,703,192 to Staudacher et al. The purpose of the Staudacher patent is to provide a "dry box" for the preparation of various compounds which would spontaneously ignite if exposed to oxygen and moisture. This device employs electrical switches, an open manometer, and other electrical devices which are not allowed in a hazardous area.

In U.S. Pat. No. 3,777,928 to Kober a process and apparatus for purging gas storage tanks is disclosed. The Kober process is primarily concerned with the purging of gas or air on board tanker ships by generating an inert purging gas. This apparatus contains a generator which includes a burner, scrubber and condenser unit, all of which would be restricted in a hazardous area.

A system for circulating a particular gas through a chamber is disclosed in U.S. Pat. No. 4,301,113 to Alguire et al. The Alguire invention is used to circulate a flammable biocidal gas through a reaction chamber without the presence of electrical equipment. An assembly attachment to a sterilizing chamber is provided with circulating means which avoid the use of electrical motors and switches.

No prior art apparatus provides a pneumatic control system which maintains an over-pressure in an enclosure to prevent the entry of hazardous gases. No prior art device is approved for use in a Class I, Division I hazardous environment to control the internal atmosphere of an electronics housing.

SUMMARY OF THE INVENTION

It is an object of the present invention to provide a purge air control system for enclosure having various electronic monitoring equipment for use in Class I, Division I hazardous environments. It is a further object of the present invention to control the flow of electrical power to the above enclosure by means of mechanical and pneumatic components. It is another object of the present invention to maintain the electronics enclosure at a slight over-pressure above the ambient thereby preventing hazardous external gas from entering the enclosure.

The purge control system or unit of the present invention is part of a three unit electronics enclosure system. This system comprises: (1) a stainless steel enclosure; (2) the purge control system for the enclosure; and (3) an explosion-proof electrical switch which supplies electrical power to the enclosure. The purge control system is mounted in the stainless steel enclosure and designed to create a "safe" or non-combustible environment within this electrical instrument enclosure. The enclosure is brought into a hazardous area in which explosive gas mixtures are present such as a refinery, a coal mine or the like.

The purge control system is composed entirely of mechanical and pneumatic components housed in a purge air box. The hose connections to the internal pneumatic and mechanical elements are located on the rear of the box and the sides are each protected by a rectangular cover plate. The purge air box is provided with a front panel on which is mounted various indicators and manual controls. Two pneumatic lights, a purge air indicator and an electrical indicator, are mounted on the front panel.

When the enclosure is first brought into a hazardous area with no purge air supply coming into the enclosure, the system is said to be in a "fail-safe" condition wherein there is no electrical power coming into the enclosure. Purge air enters the controller through a supply connection directly into a pressure regulator and then into a six port manifold. A portion of the purge air passes through a flow meter and to the enclosure at an initial high purge flow rate of 1.5 to 1.75 SCFM. The manifold also feeds air pressure to the pneumatic components housed in the interior of the purge air box. Purge air enters the enclosure and circulates inside and is finally expelled through a flame arresting relief valve.

After the pressure in the enclosure reaches 2 to 5 inches of water (27 inches of water=1 psi) the pressure information is communicated back to the purge controller through the return signal connection at the rear of the box. The return signal activates a three-way valve that provides a control signal at its output; this control signal first turns a purge air pneumatic indicator light (mounted on the front panel) to green. The green light indicates that the desired pressure conditions have been reached within the separate electronics enclosure. The control signal from the three-way valve is also fed to various valves, one of which is a pilot valve for a horn disable or shut-off valve. The shut-off valve is thereby automatically re-set immediately after the purge light has turned green.

At the same time, this control signal from the three-way valve is also sent to a pneumatic time delay starting a timer. The timer has been pre-set to allow sufficient time for five volumes of air at 1.5 SCFM to enter and exit the enclosure before it times out. Afterwards a delayed pneumatic signal is relayed from the time delay through to a two-way toggle valve and thence to a pressure-operated, explosion-proof switch thereby activating the same providing electrical power to the enclosure. At the same time, the toggle valve sends this same delayed signal to a second pneumatic indicator light turning it to green. This green electrical light indicates that electrical power has been established to the enclosure.

A portion of the output signal generated after the pneumatic timer "times out" is directed to a two-way valve that activates and automatically reduces the purge air flow rate to a leakage compensation level of approximately 0.2 SCFM. The internal atmosphere of the enclosure is now "safe" to operate its electronic equipment. The purpose of the purge control system is to maintain the enclosure at a slight overpressure above the ambient. Although there may be some leakage to the outside to the enclosure, external gas is prevented from entering.

In the event of loss of enclosure pressure, generally when the enclosure pressure drops below 2 inches of water pressure or if at any time the return signal from the enclosure is lost, the following sequence will take place. At the time the purge control system senses the loss in pressure, this loss of pressure is sensed by the various valves to depressurize the electrical switch immediately, thereby removing electrical power from the enclosure. At the same time, both the purge light and the power light turn red, indicating a loss of pressure in the enclosure and a loss of electrical power to the enclosure, respectively. Simultaneously, a pneumatic horn sounds as an alram, which can be silenced by an operator depressing a horn silence valve botton on the front panel.

If the operator knows the area to be safe, a purge override valve can be activated by means of a toggle switch on the front panel. The override valve supplies a pneumatic signal to the electrical switch which repressurizes it and returns electrical power to the enclosure. Although the electrical power light turns green, the purge air light will remain red until the return signal indicates that the purge air pressure in the enclosure has been re-established. Once the enclosure pressure has been returned to the set rate, the entire start-up cycle will be repeated.

BRIEF DESCRIPTION OF THE DRAWINGS

FIG. 1 is a front elevational view of the purge control unit in accordance with the present invention;

FIG. 2 is a side elevational view of the purge control unit showing its internal components as taken along cross-section line 2—2 of FIG. 1;

FIG. 3 is a rear elevational view as taken along section line 3—3 of FIG. 2;

DETAILED DESCRIPTION OF THE PREFERRED EMBODIMENTS

Figure 5:
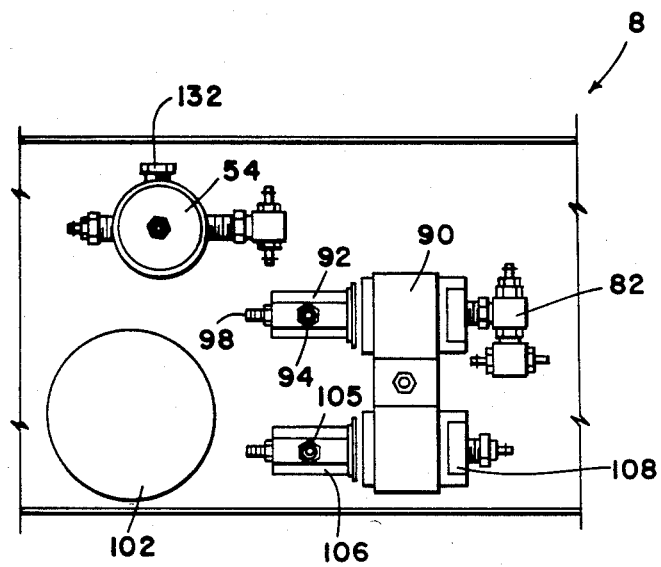
FIG. 5 is a cross-sectional view taken along section line 5—5 of FIG. 4.

Referring to the drawings in detail, the purge control system 8 of the present invention comprises a purge air box 10 provided with a front panel 12 secured thereto by means of screws 14 and nuts 16, and two cover plates 18 secured to the sides of box 10 by means of screw 20. All of the internal components housed inside box 10 are either pneumatic or mechanical, whose details will be disclosed hereinafter. The entire assembly of the purge control system is mounted on a 316 stainless steel enclosure (not shown). The enclosure houses various electronic components and is fitted with a flame arresting relief valve (not shown) designed to relieve at 8 to 15 inches of water (27 inches of water is equal to 1 psi). The present invention is designed to supply a non-hazardous inert gas (hereinafter sometimes referred to as "purge air" or "air") to the enclosure and maintain the same at a slight over-pressure above the ambient. However, the above electronics enclosure forms no part of the invention.

As shown in FIG. 1, two pneumatic indicator lights 22 and 24 are mounted on front panel 12 and each light can provide either a green or red signal light. These "lights" 22 and 24 (the details of which are not shown herein) are pressure-operated devices which are available in the marketplace under the name "Roto Wink"; a movable fluorescent element is visible through a curved transparent portion of the device; when there is no pressure in the device the movable element presents a fluorescent red color through the viewing "glass", and when the device is under pressure, a fluorescent green color.

Figure 6:
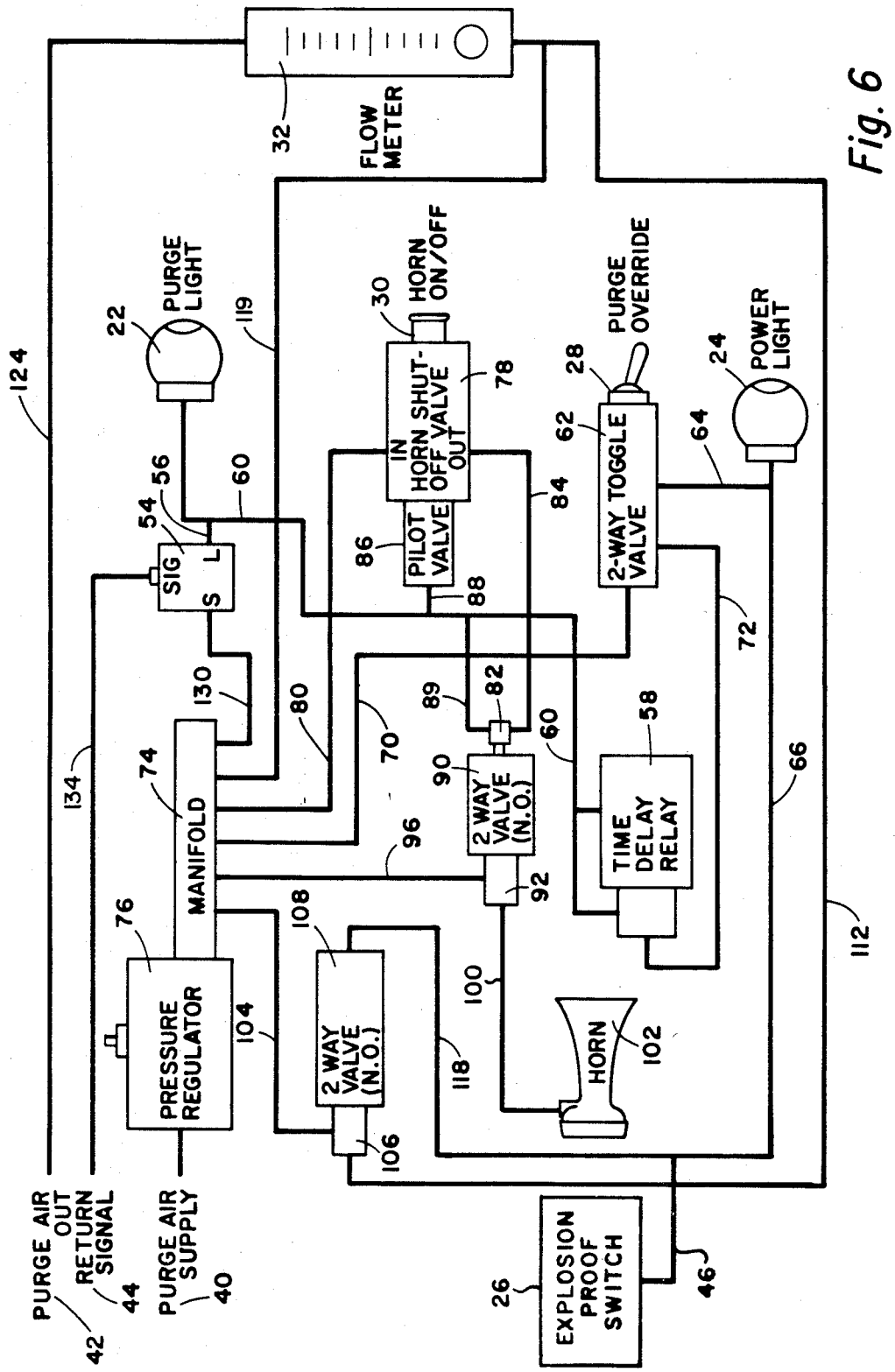
FIG. 6 is an internal schematic of the operation of the purge control device of the present invention.

Pneumatic light 22 is used to indicate the condition of the purge air pressure coming from the enclosure; and pneumatic light 24 is used to indicate the condition of the electrical power going into the enclosure by means of an explosion-proof switch 26 (see FIG. 6). A purge override or enclosure maintenance switch 28 is mounted on panel directly above light 24 and below a horn silence button 30; the purpose of both will be disclosed in greater detail hereinafter. A flow meter or control 32 is also mounted on the front panel and is calibrated from 10 to 100 SCFH.

Referring to FIG. 3, the purge control system 8 is provided with a plurality of input and output fittings or couplings which are mounted on the rear portion of purge box 10. These fittings include hose connections which provide pneumatic communication between the system 8 and the enclosure. The uppermost fitting is an input port 40 for receiving a purge air supply into the purge control system. The other fittings comprise an output port 42 for communicating purge air out to the enclosure, an input port 44 for receiving a return pneumatic pressure signal from the enclosure, and another output port 46 for transmitting a pneumatic signal to the explosion-proof switch. The purge control system 8 is also provided with a removable plug 48.

Figure 4:
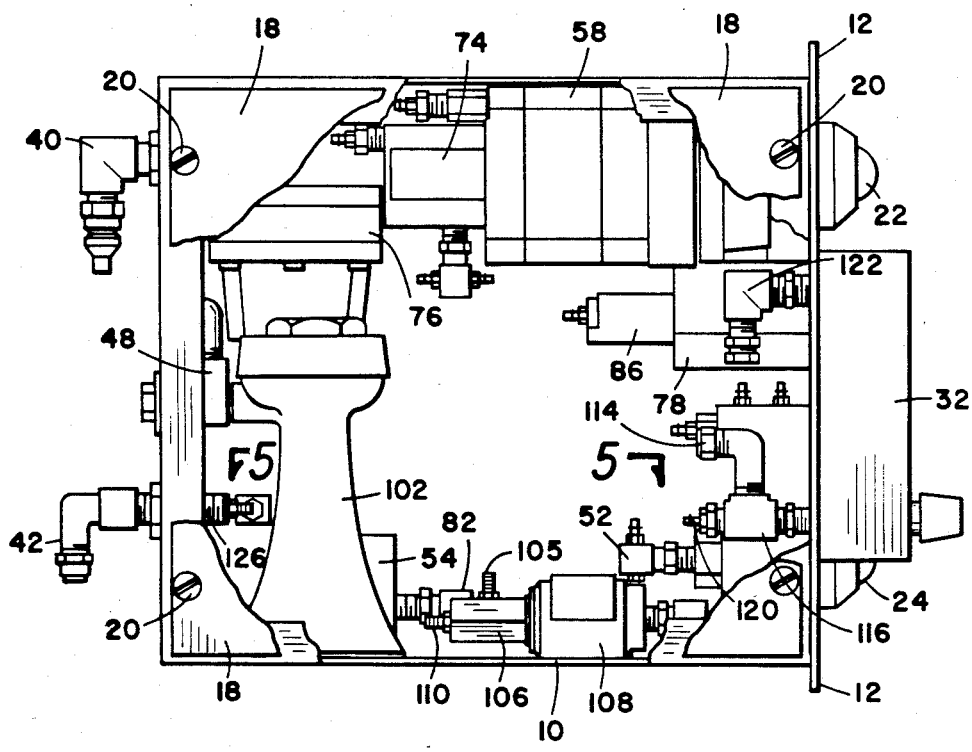
FIG. 4 is a cross-sectional view taken along section line 4—4 of FIG. 3.

Referring to FIGS. 2, 4 and 5 and the schematic FIG. 6, the pneumatic lights 22 and 24 are provided with fittings 50 and 52, respectively for each receiving 1/16 inch polyurethane hoses. These hoses are sometimes hereinafter referred to as "lines", and it should be understood that the actual hoses are not necessarily as long as the "lines" appear, or even connnected precisely in the same manner as the lines indicate; the schematic drawing FIG. 6 is illustrative, however, of the manner in which the various valves and pneumatic components are connected to each other in the overall pneumatic circuit.

Purge air light 22 is pneumatically connected to a three-way fluidic valve 54 by means of line 56, and is also connected to a pneumatic time delay 58 by means of line 60. Lines 88 and 89 connected off of line 60 serve to indicate that the output signal from the three-way fluidic valve is fed to a pilot valve 86 and the upper port of a toggle valve 82, respectively.

The pneumatic light 24 is pneumatically connected to a purge override toggle valve 62 by means of line 64, and is also connected to explosion-proof switch 26 by means of 1/16 inch hose line 66 which connects with the port 46.

The purge override switch 28 controls the flow in toggle valve 62 which is connected by means of 1/16 inch hose lines 70 and 72 to a six port manifold 74 and time delay 58, respectively. The manifold 74 is adjacent and connected to a pressure regulator 76 which is subsequently connected to input port 40 for the purge air supply. Horn button 30 controls a horn shut-off valve 78 which is connected by a 1/16 inch hose line 80 to manifold 74, and to a small shuttle valve 82 by means of 1/16 inch hose line 84. A small pilot valve 86 which is connected to the rear portion of shut-off valve 78 receives its signal through hoses or lines 60 and 88 for operating, or resetting, the shut-off valve 78. When the valve 78 has been reset, there is no pressure in the line 84.

The shuttle valve 82 is connected to a first (normally opened) two-way or actuator valve 90 which is subsequently connected to a first spool valve 92. Spool valve 92 is provided with a fitting 94 for receiving ¼ inch nylon tubing line 96 connecting valve 92 to manifold 74 by means of one of its two larger ports 75. A rearward fitting 98 connects another ¼ inch tubing line 100 to a pneumatic horn 102.

The other larger port 75 of manifold 74 is provided with a pneumatic connection by means of ¼ inch tubing line 104 to a fitting 105 on second spool valve 106 which is connected to a second (normally opened) actuator valve 108. A rearward fitting 110 on spool valve 106 receives a ¼ inch tubing line 112 which is connected to an input orifice 114 on a flow meter fitting 116 for the flow meter 32. The tubing line 112 provides the main (initial) flow of purge air to the flow meter. A 1/16 inch hose line 118 connects actuator valve 108 to the port 46 for the switch 26 so as to be in communication with the line 66 from the toggle valve 62.

Flow meter 32 is connected to the fitting 116 which is also connected to the manifold 74 by means of a 1/16 inch hose line 119 at purge air orifice 120. Line 119 remains in communication with the flow meter and provides the lower flow condition therethrough after the two-way valve 108 is actuated as will hereinafter appear. The upper portion of meter 32 is connected to an output fitting 122 which receives a ¼ inch tubing line 124. The line 124 is connected to an internal fitting of the purge air outport 42.

The three-way fluidic valve 54 is connected to the manifold 74 by means of a 1/16 inch hose line 130, and is also provided with a purge air orifice 132. Orifice 132 provides connection for a ¼ inch tubing line 134 which communicates the return signal from the enclosure through inlet port 44.

THE OPERATION

The stainless steel enclosure, having purge control system 8 mounted thereon, is brought into a hazardous area with no purge air supply coming into the enclosure. At this time the system is said to be in a "fail-safe" condition wherein there is no electrical power into the enclosure. Purge air supply enters through fitting 40 into pressure regulator 76 and then into six port manifold 74. The manifold distributes the purge air to the various internal pneumatic components housed in purge box 10.

A portion of the purge air is supplied by line 119 to flow meter 32 which subsequently passes the purge air out at an initial high purge flow rate of 1.75 SCFM to the enclosure by means of line 124. After the pressure in the enclosure reaches 2 to 5 inches of water, the pressure information is communicated back to the system by means of line 134. This pressure signal passes to three-way valve 54 and via line 56 to turn purge indicator light 22 to green. The green light indicates that the desired over-pressure conditions have been reached within the enclosure. The pneumatic signal also passes to horn shut-off valve 78, which is automatically reset to "on" after purge light 22 turns green.

Simultaneously to the above events, a signal is sent via line 60 to time delay 58 starting its timer. This timer is pre-set to allow sufficient time for five volumes of air at 1.5 SCFM to enter and exit the enclosure, the purpose of which is to exhaust any concentration of hazardous gases. After the time delay 58 times out, a pneumatic signal is relayed by line 72 to two-way toggle valve 62 sending its own signal by line 66 through the port 46 to the explosion-proof switch 26 thereby activating the same to provide electrical power to the enclosure. At the same time a signal is sent by line 64 from valve 28 to pneumatic power light 24 turning it to green, and thereby indicating the electrical status of the enclosure. When the delayed signal is sent by line 66 to the explosion-proof switch 26, line 118 (which is connected to line 66) directs the delayed signal to two-way valve 108 to actuate this valve; valve 108 moves shuttle valve 106 so as to interrupt the output of the shuttle into line 112. When the flow to the flow meter 32 is interrupted from line 112, the purge air flow is automatically reduced to a leakage compensation level of approximately 0.2 SCFM (from the line 119 alone). The internal atmosphere of the enclosure is now considered "non-hazardous" and its electronic equipment may be used.

In the event that the enclosure pressure drops below 2 inches of water or if at any time the return signal is lost, the following sequence takes place. When the purge control system 8 senses a loss in pressure by line 134, the pneumatic signal is lost from fluidic valve 54, all of the various components decribed above which are in communication with the fluidic valve will sense a "zero" pressure signal. The above simultaneous "zero" signal causes the depressurization of switch 26 thus removing electrical power from the enclosure; and both lights 22 and 24 to turn red, indicating the loss of pressure and the loss of power, respectively. The removal of pressure from the line 89 to the toggle switch 82 will cause the valve to open 90 with subsequent movement of the spool valve 92 to apply full pneumatic pressure to the horn 102. Pneumatic horn 102 is thus activated, sounding an alarm. An operator can silence the horn by depressing horn silence button 30 on front panel 12. Horn silence button 30, when depressed, will physically move the interior of the valve 78 so that pressure passes from the port 80 through the valve 78 and to the line 84. When line 84 applies pressure to the toggle valve 82, the toggle valve actuates the valve 90 to reverse the spool valve 92 and cut off the pneumatic signal to the horn 102. When the system is repressurized, the pilot valve 86 will reset the shut-off valve 78.

If the operator knows the area to be safe, he may manually return electrical power to the enclosure by means of purge override toggle switch 28 on the front panel. The valve 62 supplies a pneumatic signal to switch 26 which repressurizes it and returns electrical power to the enclosure. The power light 24 turns green, while purge light 22 remains red until signal 44 indicates purge air pressure has been established. When the enclosure pressure reaches its set rate, the above start-up cycle will be repeated. Preferably, a cover (not shown) is provided over the toggle to prevent accidental actuation of the toggle switch 28.

Whereas, the present invention has been described in relation to the drawings attached hereto, it should be understood that other and further modifications, apart from those shown or suggested herein, may be made within the spirit and scope of this invention.

What is claimed is:

1. A purge control system for providing and maintaining a non-hazardous environment within an electronics enclosure comprising a separate purge air box housing non-electrical components, an outlet port on the box for supplying inert gas under pressure from a purge air supply to the electronics enclosure and an inlet port on the box for receiving inert gas under pressure back from the electronics enclosure; a manifold mounted in the box; a pressure regulator mounted in the box and in fluid communication with a purge air supply for providing the purge air to the manifold; a flow meter mounted on the box for providing a flow of purge air from the manifold to the electronics enclosure through the outlet port and for determining the rate of flow to the outlet port; a signal valve having one inlet in communication with the manifold and another inlet in communication with the inlet port; the signal valve having an outlet providing a pneumatic signal when pressure is received at the inlet port; a first pneumatic light mounted on the box connected to the outlet of the signal valve for indicating the status of purge air pressure coming from the enclosure; a time-delay pneumatic relay connected to the outlet of the signal valve for providing a delayed signal in response to the signal received by the signal valve; an explosion-proof, pneumatically operated switch connected to the output of the time-delay relay for providing electrical power to the electronics enclosure in response to the delayed signal; and a second pneumatic light mounted on the box and responsive to the delayed signal for indicating the status of electrical power going into the enclosure through the explosion-proof switch.

2. A purge control switch as set forth in claim 1 wherein the supply of purge air from the manifold to the flow meter is through a first direct connection with the manifold and a second path through a two-way valve means whereby the purge air passes through said flow meter into said enclosure at an initial high flow rate; the two-way valve means being connected to the output of the time-delay relay so as to interrupt the second path in response to the delayed signal thereby reducing the flow of purge air through the flow to a lower flow rate.

3. A purge control system as set forth in claim 1 wherein an override valve is connected between the output of the time-delay relay and the explosion-proof switch and also to the manifold; and wherein an override switch is mounted on said enclosure for manually operating said override valve to connect said explosion-proof switch to a supply of purge air even after the initial disabling of said explosion-proof switch following a loss of pressure at the inlet port.

4. A purge control system as set forth in claim 1 and including pneumatic alarm means being in fluid communication with said signal valve wherein a loss of pneumatic pressure from said enclosure causes said signal valve to transmit a signal to said alarm means thereby sounding an alarm; and a silence button being mounted on said enclosure whereby manually depressing said silence button deactivates said alarm means.

5. A purge control system as set forth in claim 5 wherein the depressing of said silence button causes movement of an alarm shut-off valve to interrupt the signal to the alarm means, and wherein said alarm shut-off valve is automatically reset upon re-establishment of predetermined pressure conditions in said enclosure.

* * * * *